United States Patent [19]
Thierry

[11] Patent Number: 5,220,721
[45] Date of Patent: Jun. 22, 1993

[54] METHOD FOR MOUNTING AN ELECTRICAL BRAKE MOTOR

[75] Inventor: Jacqui Thierry, Sallanches, France

[73] Assignee: Somfy, France

[21] Appl. No.: 853,920

[22] Filed: Mar. 19, 1992

[30] Foreign Application Priority Data

Apr. 9, 1991 [FR] France .................................. 91 04310

[51] Int. Cl.[5] ............................................. H02K 15/04
[52] U.S. Cl. ..................................... 29/598; 29/525.1; 29/732; 310/42
[58] Field of Search .............. 29/596, 598, 732, 525.1; 310/42, 77, 93, 76, 90

[56] References Cited

U.S. PATENT DOCUMENTS 4,199,861 4/1980 Buckman et al. ...................... 29/598
4,878,289 11/1989 Lautner et al. ......................... 29/596

FOREIGN PATENT DOCUMENTS 0043498 6/1981 European Pat. Off. .
1165186 9/1969 United Kingdom .

Primary Examiner—Carl E. Hall
Attorney, Agent, or Firm—Laff, Whitesel, Conte & Saret

[57] ABSTRACT

A method for mounting the rotor and the brake of an electrical brake motor whose brake comprises a plate (4) which can be axially moved between the rotor (2) and a backplate (5) due to the opposing actions of the magnetic field and of a spring (8). The method consists in simultaneously mounting the rotor (2), the brake plate (4) and the backplate (5) onto the shaft of the motor, by pushing them by means of a tool (14) pushing directly, on the one hand, the plate and the rotor and, on the other hand, the backplate, in such a manner that the air-gap value (n) is exclusively and automatically determined by the configuration of the tool and of the plate.

4 Claims, 2 Drawing Sheets

METHOD FOR MOUNTING AN ELECTRICAL BRAKE MOTOR

FIELD OF THE INVENTION

The subject of the present invention is a method for mounting the rotor and the brake of an electrical brake motor whose brake comprises a plate which can be axially moved between the rotor and a backplate fixed at least axially to the shaft of the rotor due to the opposing actions of the magnetic field and of an elastic means.

PRIOR ART

In brakes of this type, generally comprising a brake lining between the plate and the backplate (EP-A-0,043,498), the distance between the two positions of the plate is equal to the air-gap between the rotor and the plate in the absence of excitation. This distance is, consequently, also called the air-gap value. This air-gap value is obtained by positioning the backplate on the shaft of the rotor. For performance reasons, the air-gap value must be as small and as uniform as possible. Up until now, the adjustment of the air-gap value has been carried out by temporary interposition of standard wedges, by optical reading or by mechanical feeler technique.

In the case of adjustment by wedges, the backplate is either fitted very carefully until the wedges are sliding in the air-gap or fitted rapidly until they abut and then withdrawn by a small controlled amount in order to enable the wedges to be extracted. Both these methods have the same drawbacks, namely the slowness of performing the task, the difficulty in automating it and the uncertain accuracy, depending on the sensitivity of the person performing the task.

In the case of adjustment by optical measurement, variations in contrast between the assembled parts, defects in the state of the surface and dust are the source of diffractions which generate inaccuracy.

As regards adjustment by mechanical feeling feeler technique, it cannot be performed satisfactorily as it is generally impossible to place the feeler directly onto the air-gap surfaces for reasons of accessibility. The measurement is therefore performed indirectly on associated surfaces, which combines all the dimensional and geometrical errors of these reference surfaces in relation to those of the air-gap.

The three abovementioned methods furthermore require a very careful machine adjustment which it is necessary to repeat each time a new series is put into operation.

SUMMARY OF THE INVENTION

The object of the present invention is to obtain an accurate air-gap value by a process obviating the drawbacks of the previous methods.

In the mounting method according to the invention the rotor, the brake plate and the backplate are mounted simultaneously onto the shaft by pushing them onto the shaft by means of a tool pushing directly, on the one hand, the plate and the rotor and, on the other hand, the backplate, in such a manner that the air-gap value is exclusively and automatically determined by the configuration of the tool and of the plate.

The method according to the invention is implemented by using a tool having two pushing zones, one of which pushes the plate and the rotor and the other the backplate.

The two pushing zones may be coplanar, in which case one of the zones interacts with protuberances of calibrated height which are integral with the plate.

If the plate has a uniform plane air-gap face, the zone for pushing the plate is then located at the end of the protuberances integral with the tool.

In all cases, the simultaneous thrust of the rotor, the plate and the backplate automatically ensures an air-gap value whose accuracy depends only on the calibrated height of the protuberances. If the protuberances are provided on the tool, it is clear that it is possible to obtain a very high accuracy.

BRIEF DESCRIPTION OF THE DRAWINGS

The attached drawing shows, by way of example, three embodiments.

DESCRIPTION OF THE PREFERRED EMBODIMENTS.

Figure 2:
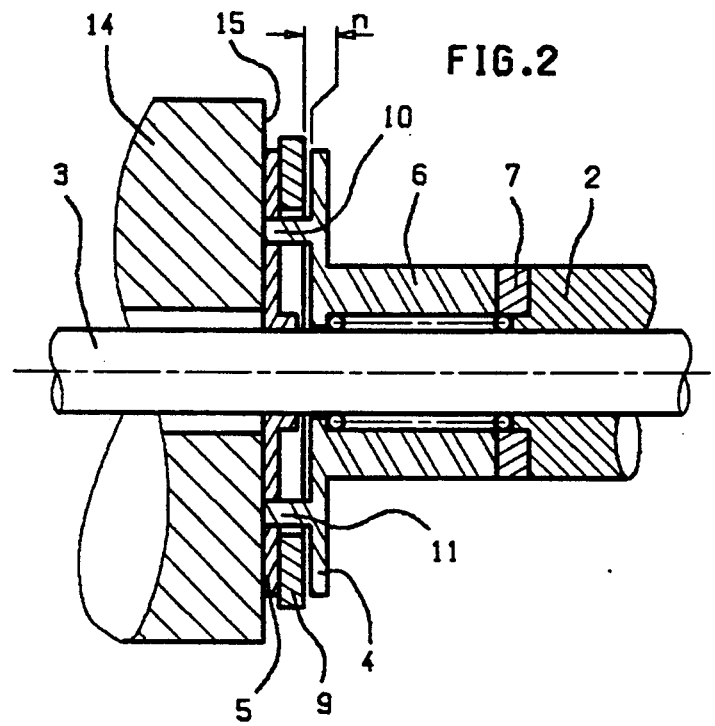
FIG. 2 illustrates the mode of mounting the rotor and the brake of the motor shown in FIG. 1.
Figure 1:
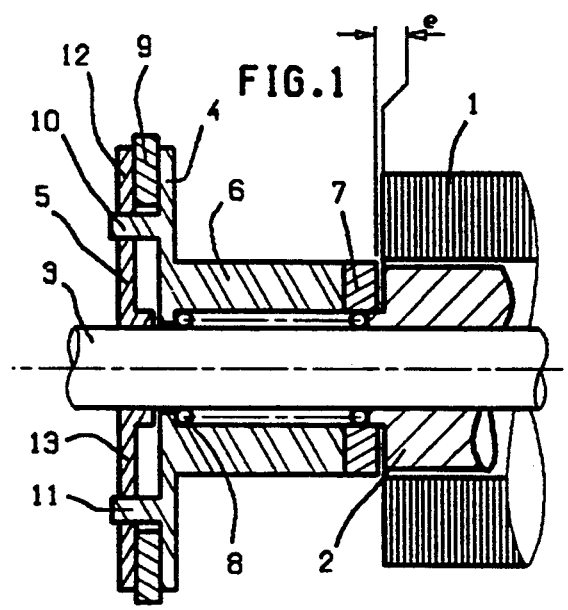
FIG. 1 is a partial view of a motor at rest, according to a first embodiment.

The motor partially shown in FIG. 1 comprises a stator 1 inside which is housed a rotor 2 fastened to a shaft 3. A brake plate 4 and a backplate 5 are also mounted onto this shaft 3. The plate 4, for example made of light alloy, is made as one part with a sleeve 6 whose end facing the rotor 2 is provided with a ring 7 made from ferromagnetic metal. The backplate 5 is fixed onto the shaft 3, whereas the sleeve 6 is axially movable on the shaft 3 and pushed in the direction of the backplate 5 by a spring 8 mounted inside the sleeve 6 and working in compression between the end of the rotor 2 and the plate 4. In the absence of excitation from the motor, the plate 4 grips a brake lining 9 against the backplate 5. The brake lining 9 consists of an annular part fixed to the housing of the motor. Such a construction is well known per se. An air-gap e of completely determined and calculated magnitude is left between the ring 7 and the rotor 2. When the motor is excited, the ring 7 is attracted against the rotor 2 thereby releasing the brake.

The brake plate 4 is fitted with at least two column-shaped protuberances 10 and 11 of determined height which are parallel to the shaft 3 and traverse cut-outs 12 and 13 which are provided for this purpose in the backplate 5.

The rotor 2, the plate 4 and the backplate 5 are mounted simultaneously onto the shaft 3. For this purpose, a tool 14 is used having a cylindrical end terminated by a plane frontal face 15 perpendicular to the axis of the cylinder. By means of the tool 14 the rotor 2, the plate 4 and the backplate 5 are simultaneously pushed onto the shaft 3. A portion of the face 15 of the tool pushes the plate 4 by means of its columns 10 and 11, whereas the remainder of the surface 15 pushes the backplate 5. The rotor 2 is pushed by the agency of the sleeve 6 and of the ring 7. The height of the columns 10 and 11 is such that once the rotor 2 is installed on the shaft 3, a space n exists between the plate 4 and the brake lining 9, this space being equal to the air-gap e.

Instead of fitting the brake plate 4 with protuberances 10 and 11, it is possible to provide these protuberances on the tool. Such embodiments are shown in FIGS. 3 and 4.

Figure 3:
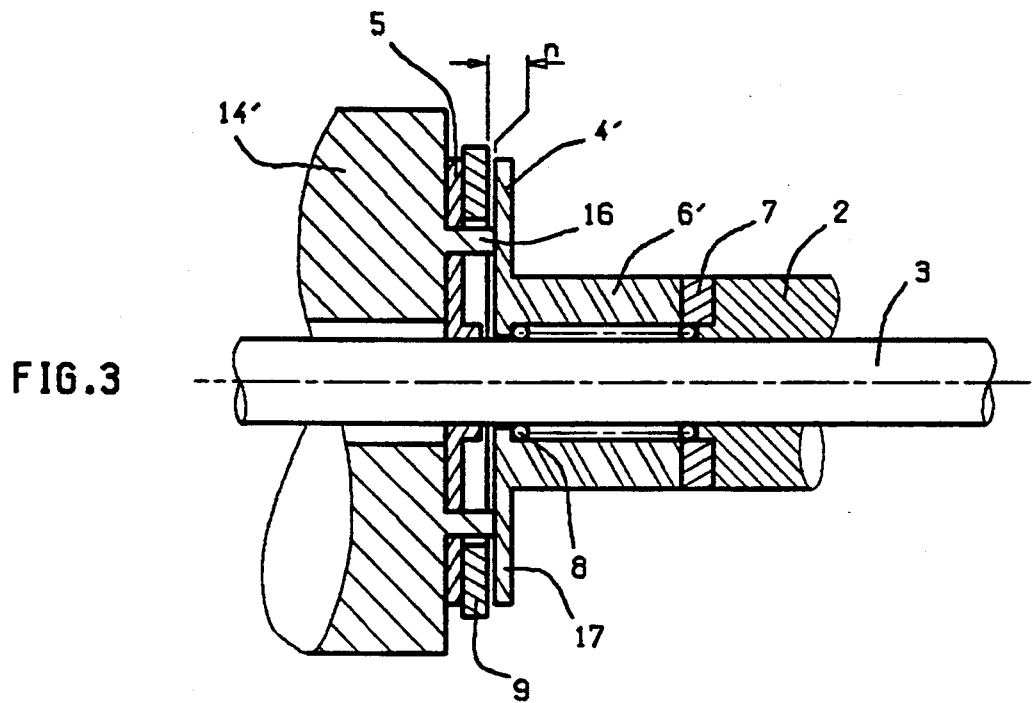
FIG. 3 illustrates the mounting of a brake according to a second embodiment.

In FIG. 3, the tool 14' has at least two columns 16 and 17 of calibrated height. The brake plate 4' is smooth. During mounting, the ends of the columns 16 and 17 push the brake plate 4', whereas the remainder of the frontal surface of the tool pushes the backplate 5. Once the rotor 2 is installed on its shaft, a space n exists between the brake lining 9 and the plate 4'. This space n is once again equal to the air-gap e.

Figure 4:
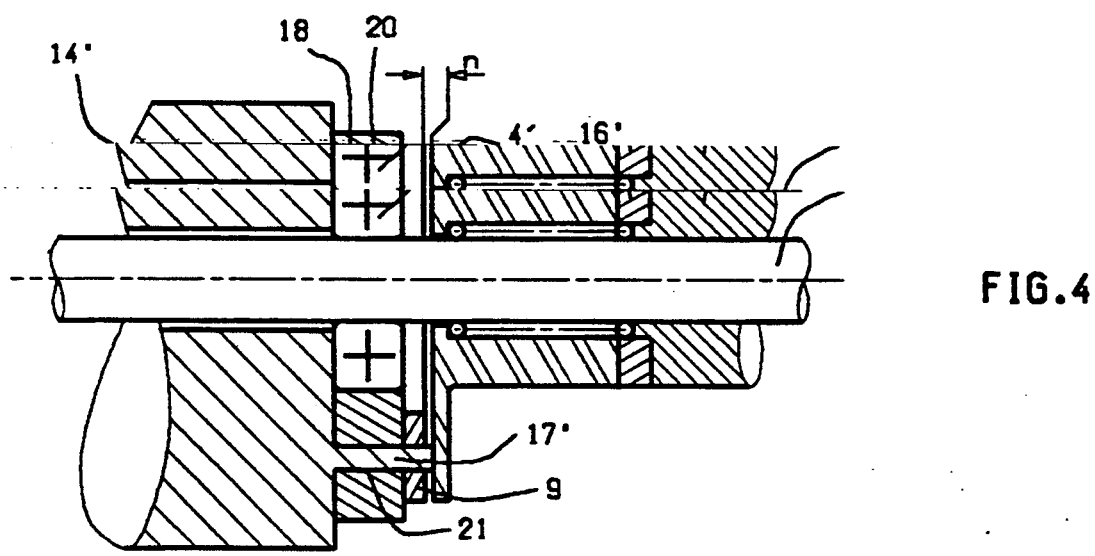
FIG. 4 illustrates the mounting according to a third embodiment.

In the embodiment shown in FIG. 4, the tool 14" is once again fitted with columns 16", 17" of calibrated height greater than the height of the columns 16 and 17. The brake lining 9 is in this case fixed to the backplate 18 produced in the form of a ring mounted on the shaft 3 by means of a ball bearing 19. The ring 18 is intended to be fixed to the housing of the motor. It has passages 20 and 21 for the free passage of the columns 16" and 17".

All the elements shown are once again pushed onto the shaft by the tool 14" which pushes the plate 4', and together with it the rotor 2, by the ends of its columns 16" and 17" and pushes the backplate 18 and its bearing 19 by the remainder of its frontal face. On pushing, a space n exists once again between the plate 4' and lining 9, this space being equal to the air-gap e.

I claim:

1. A method for mounting a rotor and a brake of an electrical brake motor onto a rotor shaft wherein said brake has a brakeplate, a backplate and a spring means, comprising
    assembling a rotor, a brakeplate, a backplate, and a brakeplate spring means,
    simultaneously pushing, with a tool that contacts both the brakeplate and the backplate, the rotor, the brakeplate, and the backplate onto the rotor shaft to axially fix the backplate and rotor to the rotor shaft and to automatically provide an air-gap value between the brakeplate and the rotor based on the configuration of the tool and the brakeplate.

2. The method of claim 1 wherein during said simultaneous pushing, pushing the rotor by said brakeplate and pushing said brakeplate and said backplate by pushing with a tool having a first pushing zone pushing said brakeplate and a second pushing zone pushing said backplate.

3. The method of claim 2 comprising pushing with a tool having said first and second pushing zones in the same plane on the face of said pushing tool.

4. The method of claim 2 comprising pushing with a tool wherein said first pushing zone is at least one protuberance on its face.

* * * * *